(12) United States Patent
Stephens

(10) Patent No.: US 7,755,644 B1
(45) Date of Patent: Jul. 13, 2010

(54) REVEALING CLIPPED PORTION OF IMAGE OBJECT

(75) Inventor: David C. Stephens, Brier, WA (US)

(73) Assignee: Adobe Systems Incorporated, San Jose, CA (US)

( * ) Notice: Subject to any disclaimer, the term of this patent is extended or adjusted under 35 U.S.C. 154(b) by 0 days.

(21) Appl. No.: 12/200,857

(22) Filed: Aug. 28, 2008

Related U.S. Application Data

(63) Continuation of application No. 10/179,716, filed on Jun. 24, 2002, now Pat. No. 7,423,655.

(51) Int. Cl.
  *G09G 5/00* (2006.01)
  *G06K 9/40* (2006.01)
  *G06K 9/36* (2006.01)
  *G06F 17/00* (2006.01)
  *G06F 3/048* (2006.01)

(52) U.S. Cl. .................. 345/624; 345/620; 345/626; 345/629; 345/619; 382/254; 382/276; 382/282; 382/284; 715/200; 715/764; 715/768

(58) Field of Classification Search ......... 345/418–422, 345/619–620, 623–626, 592, 629–630; 382/172, 382/254, 276, 282–284; 715/200, 276, 700, 715/764, 768

See application file for complete search history.

(56) References Cited

U.S. PATENT DOCUMENTS

| | | | |
|---|---|---|---|
| 6,310,620 B1 | 10/2001 | Lauer et al. | |
| 6,377,269 B1 | 4/2002 | Kay et al. | |
| 6,377,276 B1 | 4/2002 | Ludtke | |
| 6,587,596 B1 | 7/2003 | Haeberli | |
| 6,894,704 B1 * | 5/2005 | Bourdev et al. | 345/629 |
| 7,385,727 B1 * | 6/2008 | Markovic et al. | 358/1.18 |
| 7,423,655 B1 * | 9/2008 | Stephens | 345/624 |
| 2003/0016221 A1 * | 1/2003 | Long et al. | 345/441 |
| 2005/0116963 A1 * | 6/2005 | Bourdev et al. | 345/619 |

OTHER PUBLICATIONS

Adobe Photoshop 6.0 User Guide, Adobe Systems Incorporated 2000, pp. 57,63,139,153,375,379.
Bauer, Peter, "A Bountiful Crop" Tutorial, About Featured Link, http:graphicssoft.about.com/gi/dynamic/offsite...%2F%2Fwww.planetphotoshop.com%2FpeteBauer14.html (1 of 5) [Jul. 8, 2002 11:53:57 AM].
Koch, S., "Voodoo's Introduction to Javascript", 1996, 1997.

* cited by examiner

*Primary Examiner*—Wesner Sajous
(74) *Attorney, Agent, or Firm*—Fish & Richardson P.C.

(57) ABSTRACT

Methods and apparatus implementing systems and techniques for revealing a clipped portion of an image. In general, in one implementation, the techniques include presenting a visual representation of an image object having a clipped portion hidden from view in the visual representation, and during an edit operation, revealing the clipped portion of the image object as a transparent image overlay in the visual representation. In another aspect, the techniques include drawing a first visual representation of an image object in an edit mode that reveals a clipped portion of the image object in the first visual representation, the first visual representation allowing at least a portion of an object lower in a drawing order and underneath the revealed clipped portion to show through the revealed clipped portion, and in response to termination of the edit mode, drawing a second visual representation of the image object in which the clipped portion of the image object is hidden, such that the at least a portion of the lower of object is visible and unobscured by the clipped portion.

20 Claims, 7 Drawing Sheets

REVEALING CLIPPED PORTION OF IMAGE OBJECT

CROSS REFERENCE TO RELATED APPLICATIONS

This application is a continuation of and claims the benefit of the priority of U.S. patent application Ser. No. 10/179,716, filed Jun. 24, 2002, and entitled "Revealing Clipped Portion Of Image Object", which is hereby incorporated by reference.

BACKGROUND OF THE INVENTION

The present application describes systems and techniques relating to modification and display of image objects in an interactive graphics editing system.

Traditional imaging software allows an image object to have a clipping definition, such as a containing frame or a clipping path, associated with the image object. Portions of the image object that fall outside of the clipping definition are not displayed. The clipping definition can be manipulated in real time, and the image object can be manipulated separate from its associated clipping definition. For example, in QuarkXPress PassPort®, provided by Quark, Inc. of Denver, Colo., a clipped portion of an image object can be modified by moving the image object with respect to the containing frame defining the clipped portion.

SUMMARY OF THE INVENTION

In general, in one aspect, the invention involves presenting a visual representation of an image object having a clipped portion hidden from view in the visual representation, and during an edit operation, revealing the clipped portion of the image object as a transparent image overlay in the visual representation. In another aspect, the invention involves drawing a first visual representation of an image object in an edit mode that reveals a clipped portion of the image object in the first visual representation, the first visual representation allowing at least a portion of an object lower in a drawing order and underneath the revealed clipped portion to show through the revealed clipped portion, and in response to termination of the edit mode, drawing a second visual representation of the image object in which the clipped portion of the image object is hidden, such that the at least a portion of the lower of object is visible and unobscured by the clipped portion.

Advantageous implementations of the invention include one or more of the following features. Revealing the clipped portion and/or drawing the first visual representation can involve transparently drawing a representation of the image object that includes the clipped portion using a blending mode that allows a lower object to show through, and drawing a representation of the image object that excludes the clipped portion. A lower image object can be drawn before the image object with the clipped portion, and a higher image object can be drawn after the image object with the clipped portion. The lower and higher objects are lower and higher in a drawing order, such as a Z order in a graphic layout application.

The edit mode is a mode in which the image object is edited. The edit mode can be a live-edit mode. Editing the image object generally involves modifying the clipped portion in some way, such as moving the image object along with its clipped portion. In the edit mode, the clipped portion can be modified in response to user input, and the visual representation can be redrawn to reveal the modified clipped portion. Modifying the clipped portion can involve changing a clipping definition associated with the image object, the clipping definition defining the clipped portion of the image object, and/or modifying the image object with respect to an associated clipping definition. Modifying the image object can involve moving the image object with respect to the associated clipping definition (e.g., a containing frame). Modifying the clipping definition can involve modifying a mask region (e.g., a soft-edged image mask) associated with the image object. Moreover, after the second visual representation has been drawn with the modified clipped portion hidden, the edit mode can be reentered, and the modified clipped portion can be remodified to unclip a portion of the image object.

The invention can be implemented to realize one or more of the following advantages. A clipped portion of an image can be revealed during modification of the clipped portion to allow the clipped portion to be easily modified. Revealing the clipped portion can involve displaying only part of the clipped portion or all of the clipped portion. A user performing the modification can readily identify which portions of the image are clipped and which are unclipped. The user can view how much image data is available at the time of the edit; thus a desired result can be achieved during the edit more quickly and with fewer mistakes. Revealing the clipped portion can be performed during live-edits of an image object, thus simplifying and streamlining the user interface. Moreover, a drawing order for multiple objects in a page layout, including both lower and higher objects, can be respected to further improve the user interface, and the clipped portion can be transparently drawn in a manner that does not create a performance penalty for an imaging application.

The details of one or more embodiments of the invention are set forth in the accompanying drawings and the description below. Other features and advantages of the invention will become apparent from the description, the drawings, and the claims.

BRIEF DESCRIPTION OF THE DRAWINGS

Like reference symbols in the various drawings indicate like elements.

DETAILED DESCRIPTION

Figure 1:
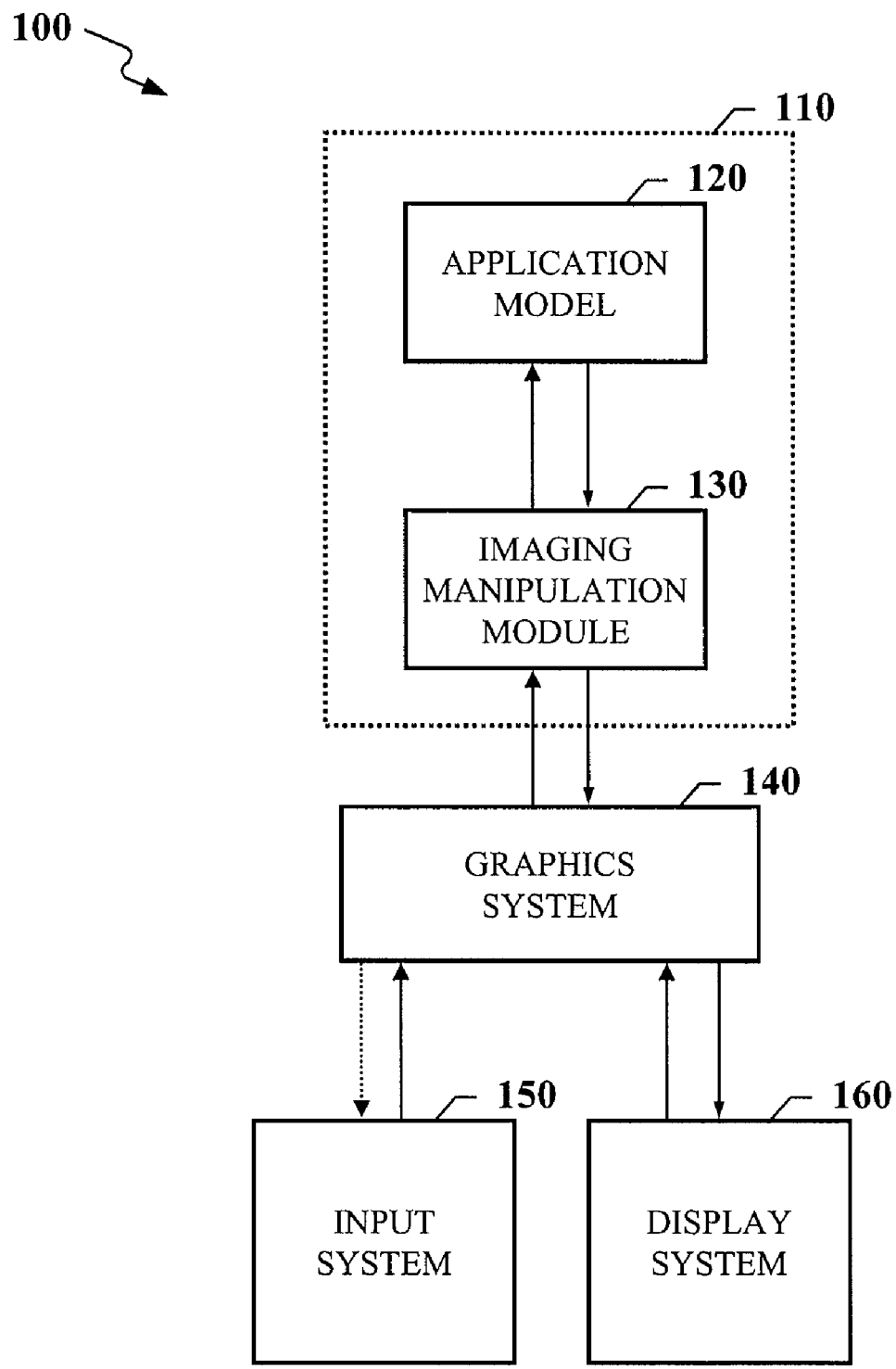
FIG. 1 is a block diagram illustrating an interactive graphics editing system.

FIG. 1 is a block diagram illustrating an interactive graphics editing system 100. The system 100 includes an imaging application 110, a graphics system 140, an input system 150, and a display system 160. Input is received from the input system 150, which includes one or more devices, such as a mouse, a joystick, a keyboard, a trackball, a trackpad, or a trackstick. Images are output to the display system 160, which includes one or more display devices, such as an LCD (liquid crystal display) or CRT (cathode ray tube) monitor. The input system 150 and the display system 160 represent a hardware component of the system 100. This hardware component can also be integrated into a single device, such as in a touch screen device and/or a stylus.

The graphics system 140 handles input and output (I/O) with the input system 150 and the display system 160. The graphics system 140 passes user input to the imaging application 110 and produces pictures on a display device using imaging information received from the imaging application 110. The graphics system 140 can be built in hardware, firmware, and/or software. For example, the graphics system 140 can be part of a personal computer and include video random access memory (VRAM), buffer, and graphics engine. The interactive graphics editing system 100 can reside in one or more machines. For example, the imaging application 110 can be part of one machine with the graphics system 140, or the imaging application 110 can reside in a separate machine and communicate with the graphics system 140 through a network.

The imaging application 110 stores and manipulates image objects to be pictured on the display and can be built in hardware, firmware, and/or software. The imaging application 110 can be a desktop publishing application, such as InDesign® or Illustrator®, both provided by Adobe Systems Incorporated of San Jose, Calif., or other imaging software. Moreover, the imaging application 110 can include a display engine, such as the Adobe Graphics Model (AGM), which is a display PostScript® engine included as a library in many applications provided by Adobe Systems Incorporated of San Jose, Calif.

An image object includes data and represents an abstract image independent of a particular display system. An image object can be an imported image that is positioned on a spread or canvas. An image object can be a raster graphic, a vector graphic, a set of instructions that when executed result in an image (e.g., instructions that can describe vector based objects or raster objects within a single image); a PDF (Portable Document Format) graphic, an EPS (Encapsulated PostScript) graphic, and/or other objects native to the imaging application 110. The imaging application 110 draws image objects on the display by sending output commands with image information to the graphics system 140. This information can include detailed geometric descriptions of what is to be viewed and attributes describing how objects should appear.

For example, an image object can have an associated clipping definition that defines a clipped portion of the image object, which is a portion of the image object data that is hidden from view. A clipping definition can be a containing frame and/or a mask region. A containing frame is a rectangular boundary that defines the border of a clipping such that all data in an image object that falls outside this boundary is clipped, or hidden from view. A containing frame is similar to an image crop except that the image data clipped by a containing frame is retained and can be unclipped at a later time. A mask region is an arbitrarily shaped region that defines the clipped portion, either expressly or inherently. The mask region can be defined by a clipping path or an image mask (e.g., a bitmap), which can be a hard-edged mask or a soft-edged mask. An image object can have both an associated containing frame and an associated mask region, which combined represent the clipping definition for the image object.

The imaging application 110 can include an application model 120 and an imaging manipulation module 130. The imaging manipulation module 130 creates, stores into, and retrieves from the application model 120. The application model 120 represents the image objects to be viewed on the display. The imaging manipulation module 130 handles user input and modification of the application model 120 in response to that input. Changes to the model 120 create corresponding changes to a view seen by the user on the display.

The imaging application 110 controls how image objects can be modified by a user and how those image objects appear before, during and after modification. When a user edits an image object that has an associated clipped portion, the imaging application 110 reveals the clipped portion as a transparent image overlay to assist in modification of the clipped portion. Revealing the clipped portion can involve displaying only a part of the clipped portion or all of the clipped portion. Thus, in an edit mode that can affect the clipped portion, the view on the display is changed such that a previously hidden part of the image object becomes visible. The newly visible clipped portion can be blended with other objects on the display such that the newly visible clipped portion does not block the view of the other objects. A user can then readily modify the clipped portion, thereby altering how the image object is clipped and/or how the object appears on the display.

Figure 2:
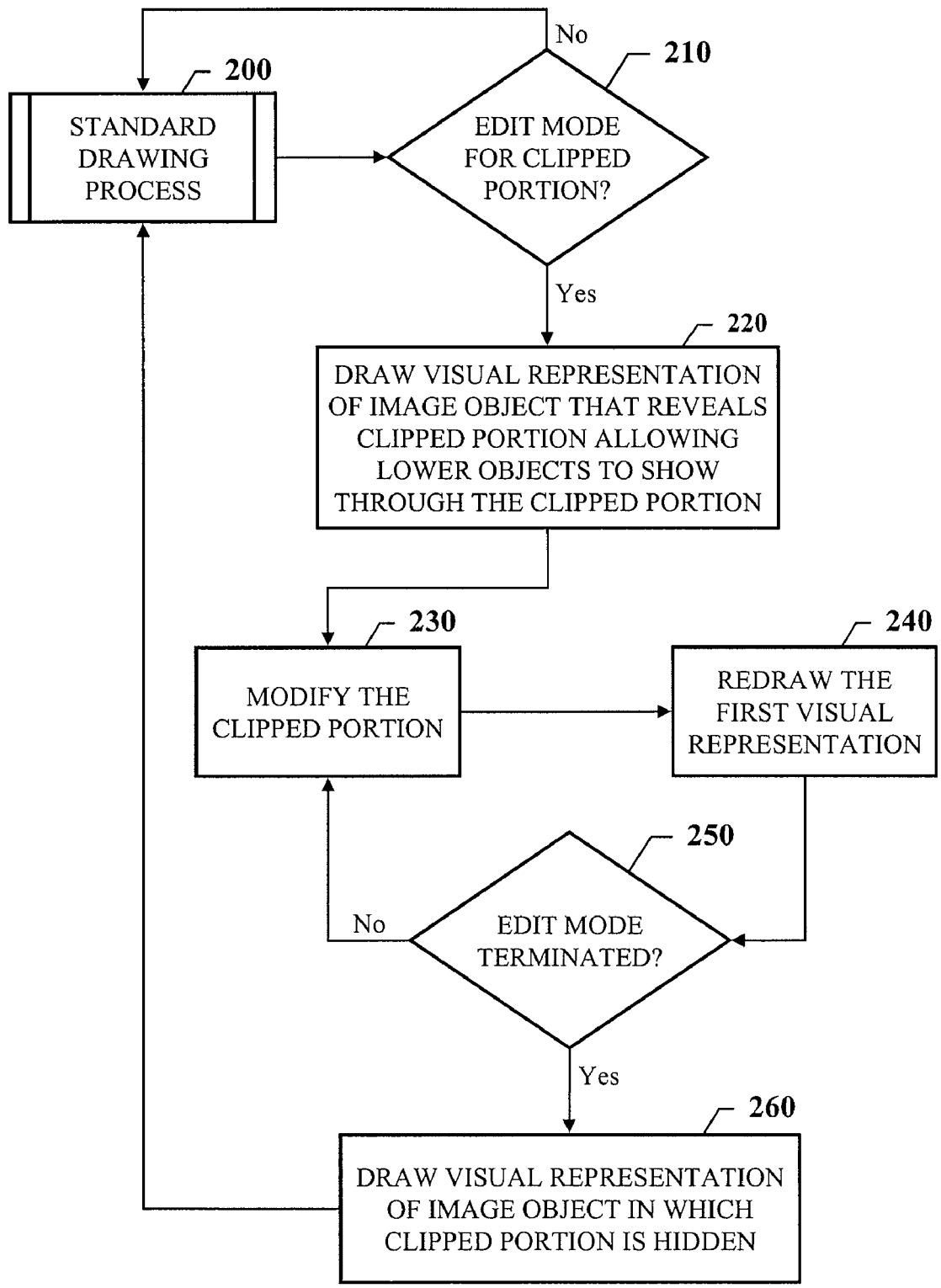
FIG. 2 is a flow chart illustrating modifying a clipped portion of an image object.

FIG. 2 is a flow chart illustrating modifying a clipped portion of an image object. A standard drawing process is performed at 200. When an edit mode for a clipped portion of an image object is begun, this is identified at 210. The edit mode can be for editing a clipping definition associated with the image object, or the edit mode can be for editing the image object with respect to the clipping definition. Moreover, the edit mode can be a live-edit mode, where the duration of the edit mode corresponds to the duration of the edit itself (e.g., an edit mode that begins when an image object is selected by a cursor to be moved with respect to an associated clipping definition, and ends when the image object is released at the end of the move; this constitutes a live-edit of an image object with respect to an associated clipping definition).

When the edit mode is begun, a visual representation of the image object is drawn at 220. This visual representation reveals the clipped portion of the image object and allows any objects lower in a drawing order and underneath the revealed clipped portion to show through the revealed clipped portion. The clipped portion is modified in response to user input at 230. The visual representation is redrawn to reveal the modified clipped portion at 240. This continues until the edit mode is terminated at 250. For example, in a live-edit mode implementation, a clipping definition can be selected and modified with a mouse (e.g., a containing frame or a clipping path can be manipulated), and the changing clipped portion can be continuously displayed as a partially transparent image; when the user releases the clipping definition, the live-edit mode is terminated.

When the edit mode ends, a new visual representation of the image object is drawn at 260. This new visual representation corresponds to a standard drawing process in which the clipped portion of the image object is hidden, such that a lower object is unobscured by the clipped portion and at least partially visible. The drawing of the new visual representation can be done as part of the standard drawing process 200, or as a separate process. For example, the area within the bounds of the unclipped image object can be erased, and then all objects intersecting the bounds of the unclipped image object can be redrawn before returning to the standard drawing process.

Figure 3:
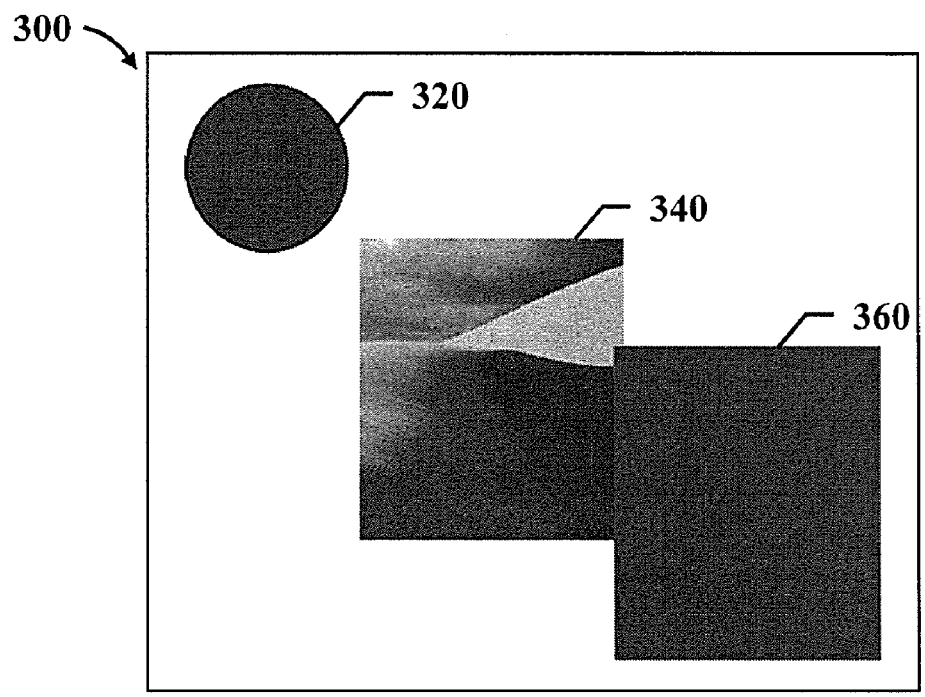
FIGS. 3-6 show an example modification of a clipped portion of an image object.

FIGS. 3-6 show an example modification of a clipped portion of an image object. FIG. 3 show an image 300 that includes a lower object 320, an image object 340, and a higher object 360. The lower object 320 is lower in a drawing order (e.g., a Z-order, the order in which objects are placed in a layout) than the image object 340, and the higher object 360 is higher in the drawing order than the image object 340. The image object 340 is clipped, and the clipped portion is hidden from view.

Figure 4:
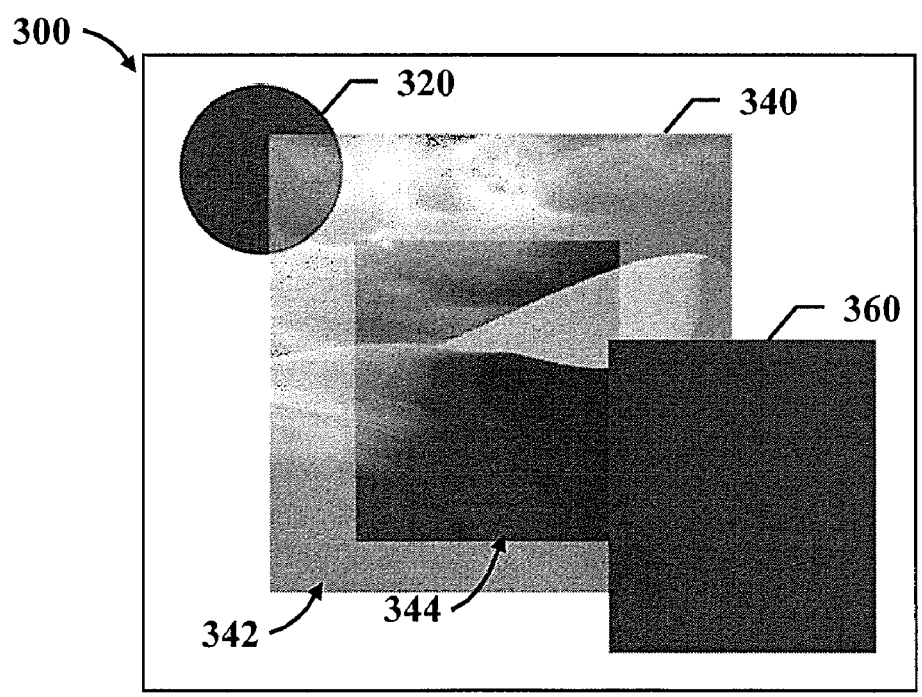

As shown in FIG. 4, when an edit mode is entered to modify a clipped portion 342 of the image object 340, the clipped portion 342 is displayed. The clipped portion 342 overlays the lower object 320, but allows the lower object 320 to show through the clipped portion 342. An unclipped portion 344 of the image object 340 appears unchanged, and the higher object 360 obscures the image object 340 as before, including the unclipped portion 344 and the newly revealed clipped portion 342.

As mentioned above, the edit mode can be for editing a clipping definition associated with the image object, or the edit mode can be for editing the image object with respect to the clipping definition. Editing the clipping definition can involve applying a transform to the clipping definition, such as a translation, rotation, scale or skew transform, manipulating points on the clipping definition, moving the clipping definition along with its associated image object, or changing values in the clipping definition in the case of an image mask. For example, an image mask can define the unclipped portion 344 with hard edges, as shown, or with soft edges (e.g., the edge of the clipping region can be defined using a gradient of transparency values in an image mask), and the values in this image mask can be changed using painting or other similar techniques.

Editing the image object 340 with respect to the clipping definition can involve applying a transform, such as above, to the image object 340, or changing values in the image object 340. For example, the image object 340 can be selected with a mouse click and dragged to a new position under the clipping definition, thus changing the portion of the image object 340 that constitutes the unclipped portion 344.

The types of edits described above can be performed in a defined edit mode with specific input designating the beginning and ending of the edit mode, such as an edit mode defined by a button in a user interface that can be selected and unselected. Alternatively, the edit mode can be a live-edit mode, where the edit mode begins and ends with an edit performed by a user. For example, a user may select a clipping scale tool that resizes clipping definitions; when the user clicks on the image object 340 with this tool, the live-edit mode begins, revealing the unclipped portion 342; movement of the mouse causes resizing of the clipping definition for the image object 340, and the live-edit mode terminates when the mouse button is released, thereby hiding the modified clipped portion. The live-edit mode can also be initiated by a defined input event that forms part of the edit performed by the user, such as holding down a mouse button for a couple of seconds at the beginning of the edit to initiate the live-edit mode.

Figure 5:
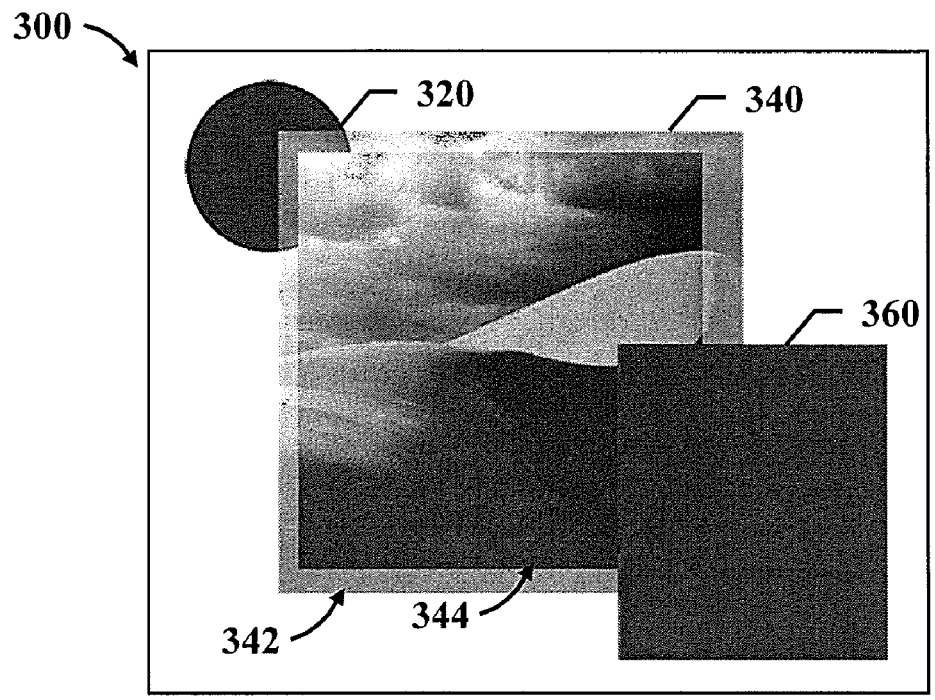
Figure 6:
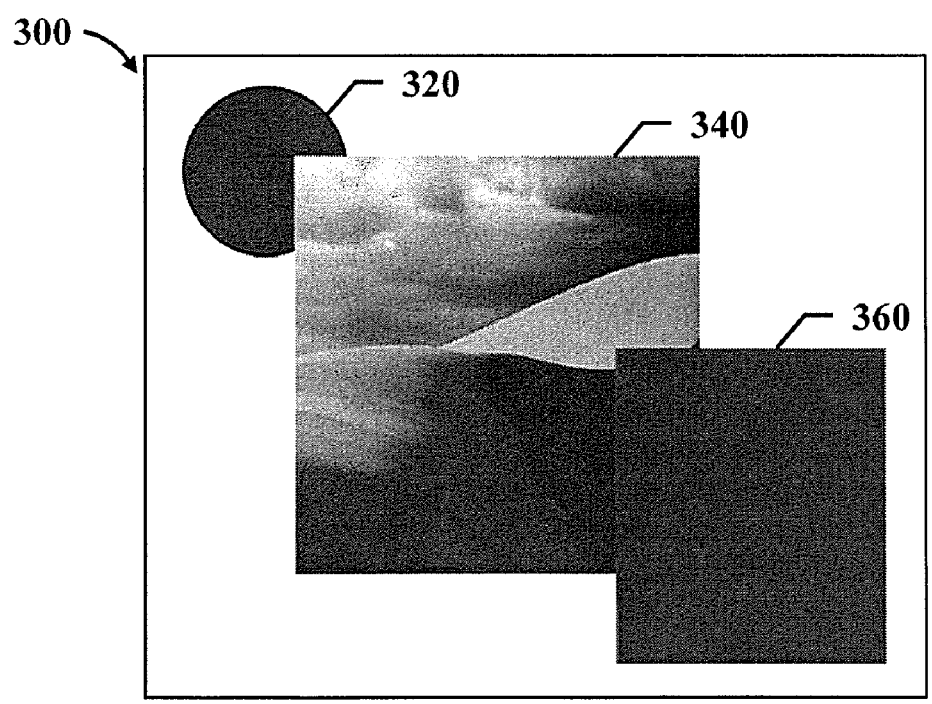

FIG. 5 shows the image 300 after the clipping definition has been resized. FIG. 6 shows the image 300 after the edit mode terminates. Thus, while a clipping definition is manipulated, or an image object is manipulated with respect to is clipping definition, a clipped portion of the image object is drawn transparently. This transparent drawing of the clipped portion can be done using a blending mode that allows the user to easily identify which portions of the image object are clipped and which portions are visible, and also see the objects in a layout that are beneath the clipped portion of the image object. Moreover, the changing clipped portion can be continuously and transparently redrawn in real-time, and a drawing order can be respected for all objects on a canvas in which the image object is placed.

Figure 7:
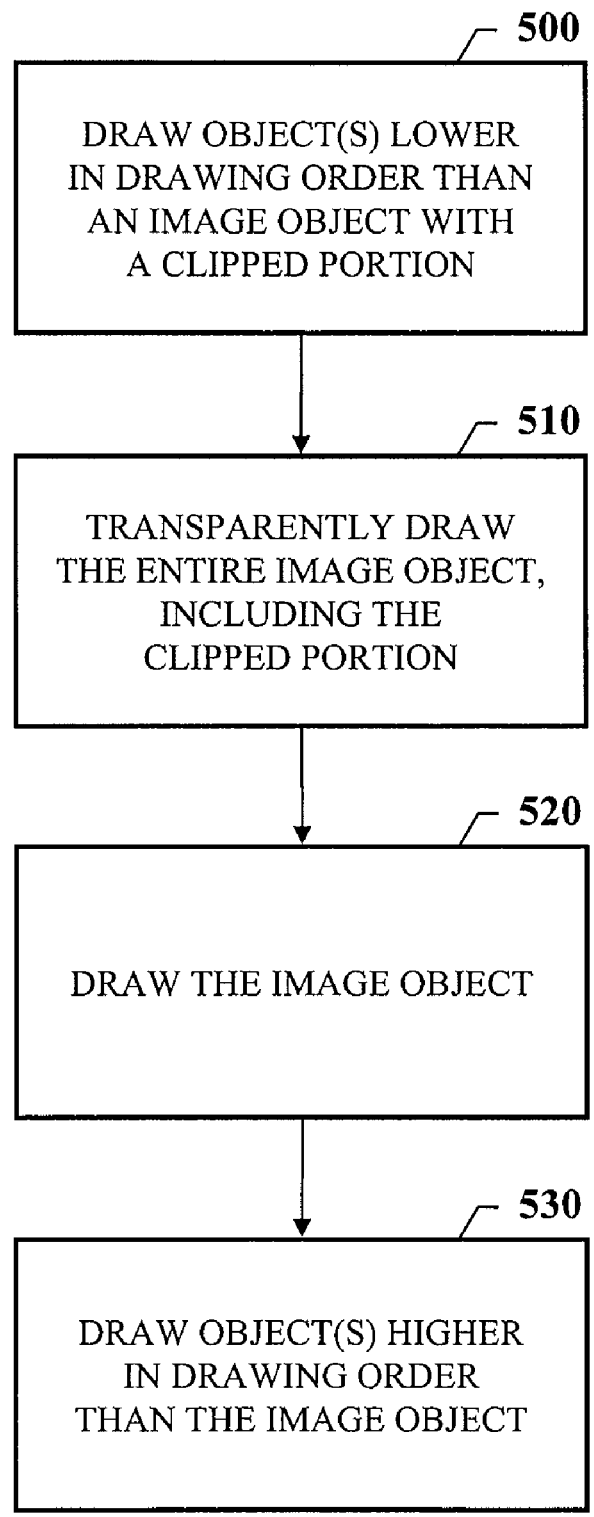
FIG. 7 is a flow chart illustrating transparently drawing a visual representation of an image object such that a clipped portion is revealed.

FIG. 7 is a flow chart illustrating transparently drawing a visual representation of an image object such that a clipped portion is revealed. Once a clipped portion of an image object is to be revealed, the following process can be used to improve performance of the imaging application. Initially, any objects that are lower in a drawing order than the image object with the clipped portion are drawn at 500. The result of such a draw operation of lower objects can be stored in a separate bitmap. This separate bitmap can be used at a later time to avoid redrawing the lower objects. This type of performance improving technique can be used in connection with other drawing operations described elsewhere in this detailed description.

Then, the entire image object, including the clipped portion, is draw transparently at 510. This transparent draw of the full image object can be performed using a transparency model included in a display engine, such as the AGM transparency model. Moreover, any existing transparency associated with the image object can be respected; thus, if the image object is normally drawn at fifty percent transparency, the transparent draw of the entire image is performed at an even higher transparency to cause the clipped portion to be distinguishable from the unclipped portion once the drawing process is completed. This compounding of transparencies can extend through a soft-edged image mask as well.

Next, the image object is drawn normally at 520; thus, the clipped portion is hidden. This drawing of the image object includes any existing transparency associated with the image object. Finally, any objects higher in the drawing order are drawn at 530.

Figure 8:
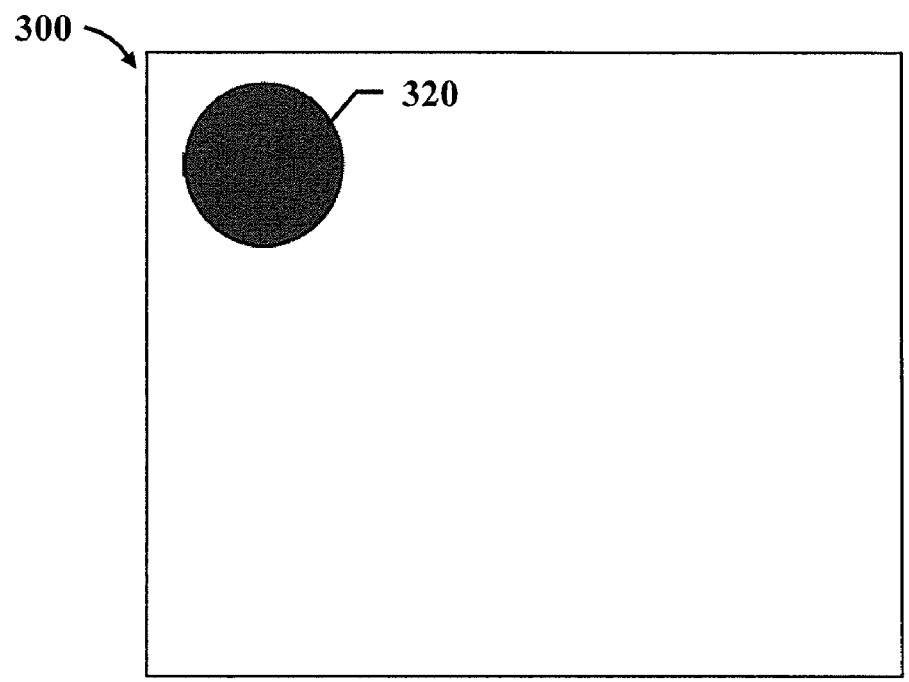
FIGS. 8-11 show the technique of FIG. 7 within the image context of FIGS. 3-4.
Figure 9:
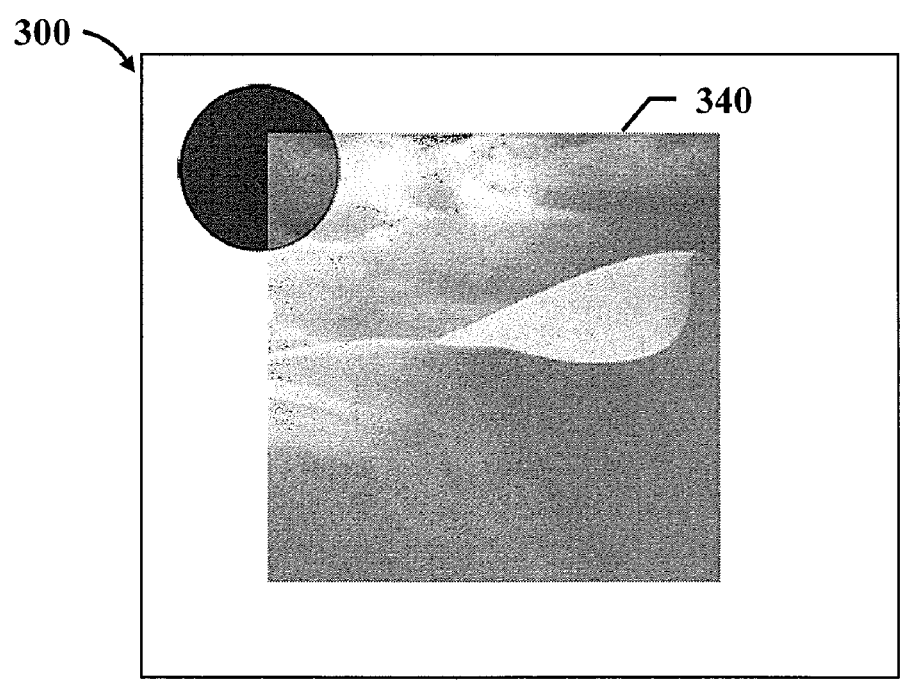
Figure 10:
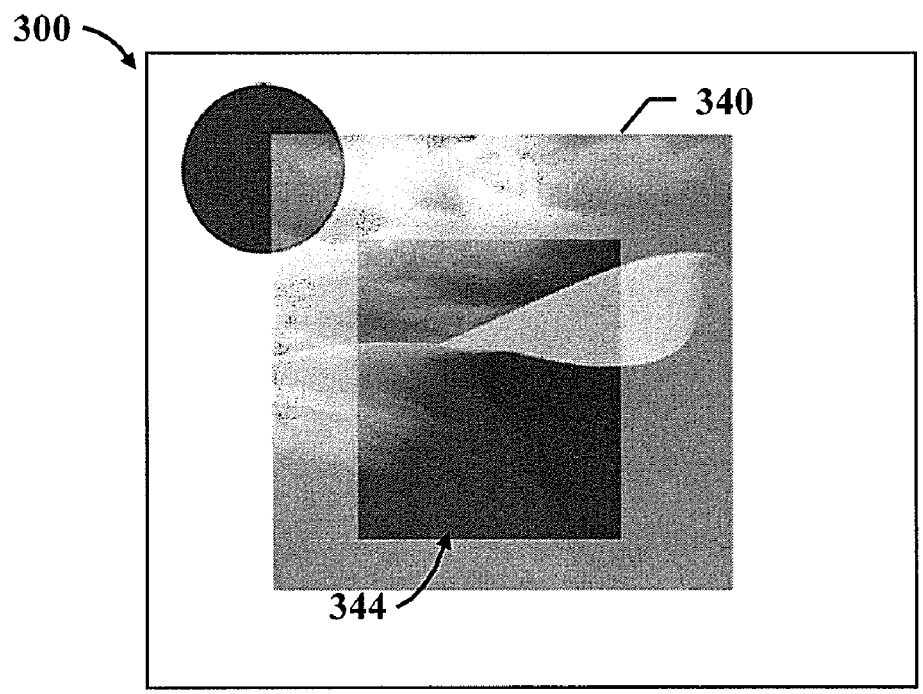
Figure 11:
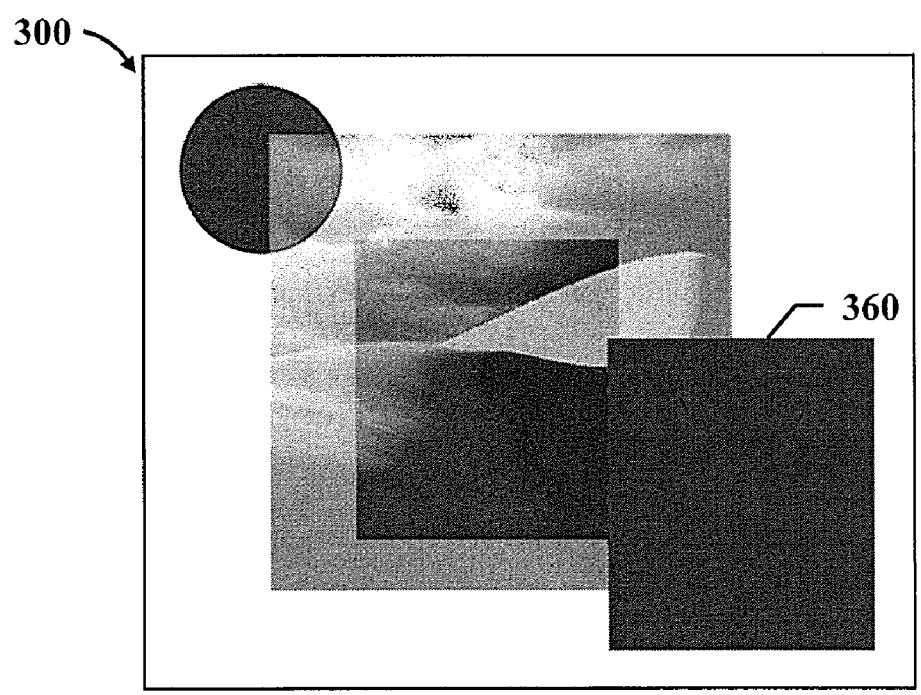

FIGS. 8-11 show the technique of FIG. 7 within the image context of FIGS. 3-4. First, the lower object 320 in the image 300 is drawn, as shown in FIG. 8. Then, the entire image object 340 is drawn transparently using a blending mode that allows objects behind the image object to show through the image object, as shown in FIG. 9. Next, the image object 340 is drawn again, but only the unclipped portion 344 is displayed, as shown in FIG. 10. Finally, the higher object 360 is drawn, blocking all objects behind it, as shown in FIG. 11.

The invention can be implemented in digital electronic circuitry, or in computer hardware, firmware, software, or in combinations of them. Apparatus of the invention can be implemented in a software product (e.g., a computer program product) tangibly embodied in a machine-readable storage device for execution by a programmable processor; and processing operations of the invention can be performed by a programmable processor executing a program of instructions to perform functions of the invention by operating on input data and generating output. The invention can be implemented advantageously in one or more software programs that are executable on a programmable system including at least one programmable processor coupled to receive data and instructions from, and to transmit data and instructions to, a data storage system, at least one input device, and at least one output device. Each software program can be implemented in a high-level procedural or object-oriented programming language, or in assembly or machine language if desired; and in any case, the language can be a compiled or interpreted language. Suitable processors include, by way of example, both general and special purpose microprocessors.

Generally, a processor will receive instructions and data from a read-only memory, a random access memory and/or a machine-readable signal (e.g., a digital signal received through a network connection). Generally, a computer will include one or more mass storage devices for storing data files; such devices include magnetic disks, such as internal hard disks and removable disks; magneto-optical disks; and optical disks. Storage devices suitable for tangibly embodying software program instructions and data include all forms of non-volatile memory, including by way of example semiconductor memory devices, such as EPROM (electrically programmable read-only memory), EEPROM (electrically erasable programmable read-only memory), and flash memory devices; magnetic disks such as internal hard disks and removable disks; magneto-optical disks; and CD-ROM disks. Any of the foregoing can be supplemented by, or incorporated in, ASICs (application-specific integrated circuits).

What is claimed is:

1. A computer-implemented method comprising:
   presenting a visual representation of an image object comprising information defining image data to be displayed, the image object having an associated clipping definition defining a clipped portion of the image data that is hidden from view in the visual representation while a corresponding un-clipped portion of the image data is shown in the visual representation; and
   during an edit operation, revealing the clipped portion of the image data by drawing the clipped portion of the image data using transparency, wherein the presenting and the revealing steps are performed by at least one computer processing device.

2. The computer-implemented method of claim 1, wherein revealing the clipped portion comprises:
   transparently drawing both the clipped portion and the un-clipped portion of the image data using a blending mode that allows a lower object to show through; and
   drawing the un-clipped portion of the image data, exclusive of the clipped portion.

3. The computer-implemented method of claim 2, further comprising:
   drawing the lower object before transparently drawing both the clipped portion and the un-clipped portion of the image data; and
   drawing a higher object after drawing the un-clipped portion of the image data, exclusive of the clipped portion.

4. The computer-implemented method of claim 1, wherein the revealing comprises revealing the clipped portion of the image data during a live-edit mode.

5. The computer-implemented method of claim 4, wherein the live-edit mode comprises a live-edit of the image object with respect to the clipping definition.

6. The computer-implemented method of claim 4, wherein the live-edit mode comprises a live-edit of the clipping definition.

7. A software product tangibly stored on a machine-readable storage device, the software product comprising instructions operable to cause a programmable processor to perform operations comprising:
   presenting a visual representation of an image object comprising information defining image data to be displayed, the image object having an associated clipping definition defining a clipped portion of the image data that is hidden from view in the visual representation while a corresponding un-clipped portion of the image data is shown in the visual representation; and
   during an edit operation, revealing the clipped portion of the image data by drawing the clipped portion of the image data using transparency.

8. The software product of claim 7, wherein revealing the clipped portion comprises:
   transparently drawing both the clipped portion and the un-clipped portion of the image data using a blending mode that allows a lower object to show through; and
   drawing the un-clipped portion of the image data, exclusive of the clipped portion.

9. The software product of claim 8, further comprising:
   drawing the lower object before transparently drawing both the clipped portion and the un-clipped portion of the image data; and
   drawing a higher object after drawing the un-clipped portion of the image data, exclusive of the clipped portion.

10. The software product of claim 7, wherein the revealing comprises revealing the clipped portion of the image data during a live-edit mode.

11. The software product of claim 10, wherein the live-edit mode comprises a live-edit of the image object with respect to the clipping definition.

12. The software product of claim 10, wherein the live-edit mode comprises a live-edit of the clipping definition.

13. A system comprising:
    at least one input device;
    at least one output device; and
    at least one processor coupled with the at least one input device and the at least one output device, and programmed to perform operations comprising:
    presenting a visual representation of an image object comprising information defining image data to be displayed, the image object having an associated clipping definition defining a clipped portion of the image data that is hidden from view in the visual representation while a corresponding un-clipped portion of the image data is shown in the visual representation; and
    during an edit operation, revealing the clipped portion of the image data by drawing the clipped portion of the image data using transparency.

14. The system of claim 13, wherein revealing the clipped portion comprises:
    transparently drawing both the clipped portion and the un-clipped portion of the image data using a blending mode that allows a lower object to show through; and
    drawing the un-clipped portion of the image data, exclusive of the clipped portion.

15. The system of claim 14, further comprising:
    drawing the lower object before transparently drawing both the clipped portion and the un-clipped portion of the image data; and
    drawing a higher object after drawing the un-clipped portion of the image data, exclusive of the clipped portion.

16. The system of claim 13, wherein the revealing comprises revealing the clipped portion of the image data during a live-edit mode.

17. The system of claim 16, wherein the live-edit mode comprises a live-edit of the image object with respect to the clipping definition.

18. The system of claim 16, wherein the live-edit mode comprises a live-edit of the clipping definition.

19. The system of claim 13, further comprising:
    an input system including the at least one input device;
    a display system including the at least one output device; and
    a graphics system coupled with the input system and the out system to handle input and output between the input/output systems and an imaging application.

20. The system of claim 19, where the imaging application includes an application model and an imaging manipulation module.

* * * * *